United States Patent [19]
McClellan et al.

[11] Patent Number: 5,453,230
[45] Date of Patent: Sep. 26, 1995

[54] METHOD FOR ROTATIONALLY MOLDING AN ARTICLE WITH A VULNERABLE INSERT

[75] Inventors: Thomas R. McClellan, Mission Viejo; John T. Mizulo, Irvine; Manuel Chacon, Anaheim, all of Calif.

[73] Assignee: Urethane Technologies, Inc., Santa Ana, Calif.

[21] Appl. No.: 161,884

[22] Filed: Dec. 2, 1993

[51] Int. Cl.⁶ .......................... B29C 44/06; B29C 44/12
[52] U.S. Cl. .................. 264/45.7; 264/46.7; 264/255; 264/271.1; 264/311
[58] Field of Search ................ 264/45.7, 46.7, 264/255, 271.1, 311, 319

[56] References Cited

U.S. PATENT DOCUMENTS

| | | | |
|---|---|---|---|
| 3,370,323 | 2/1968 | Sato | 18/26 |
| 3,391,823 | 7/1968 | Tijms | 264/311 |
| 3,434,205 | 3/1969 | Mosier, Jr. | 29/594 |
| 3,534,129 | 10/1970 | Bartel | 264/45.1 |
| 3,547,747 | 12/1970 | Roberts | 264/46.7 |
| 3,609,814 | 10/1971 | Vox et al. | 18/26 |
| 3,870,775 | 3/1975 | Castro et al. | 264/311 |
| 3,875,275 | 4/1975 | Lemelson | 264/45.7 |
| 3,880,406 | 4/1975 | Stehle et al. | 256/65 |
| 3,954,689 | 5/1976 | Hoeschele | 260/22 |
| 4,042,663 | 8/1977 | Harder, Jr. | 264/46.7 |
| 4,115,619 | 9/1978 | Kurfman et al. | 428/336 |
| 4,123,307 | 10/1978 | Lemelson | 264/45.7 |
| 4,183,883 | 1/1980 | Blair | 264/40 |
| 4,342,071 | 7/1982 | Chamberlain | 362/158 |
| 4,368,168 | 1/1983 | Slepcevic | 262/272.14 |
| 4,686,765 | 8/1987 | Byers et al. | 29/858 |
| 4,725,395 | 2/1988 | Gasparaitis et al. | 264/250 |
| 4,855,096 | 8/1989 | Panaroni | 264/45.5 |
| 4,864,749 | 9/1989 | Brown | 40/299 |
| 4,943,223 | 7/1990 | Panaroni | 425/116 |
| 4,956,135 | 9/1990 | Payne | 264/311 |
| 5,037,497 | 8/1991 | Stypulkowski | 156/245 |

*Primary Examiner*—Allan R. Kuhns

[57] ABSTRACT

Methods and apparatus for molding a solid article incorporating one or more vulnerable inserts are disclosed. Centrifugal casting methods for producing a finished article composed of single or multiple curable fluid compounds utilize a self-releasing securing device for holding an insert stably and insulatedly protected within a mold.

3 Claims, 4 Drawing Sheets

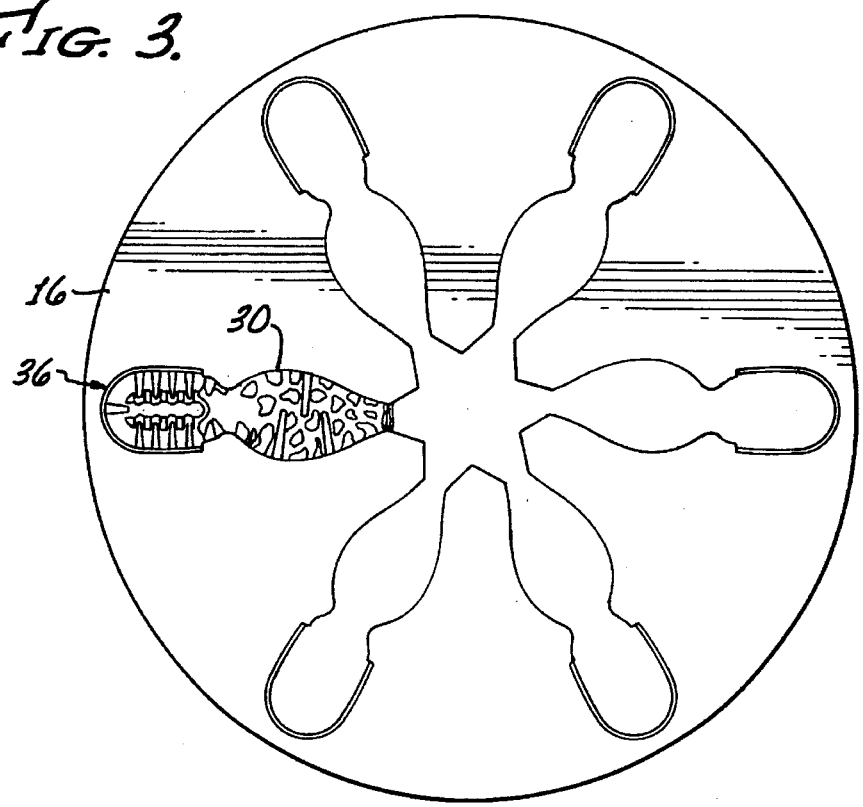
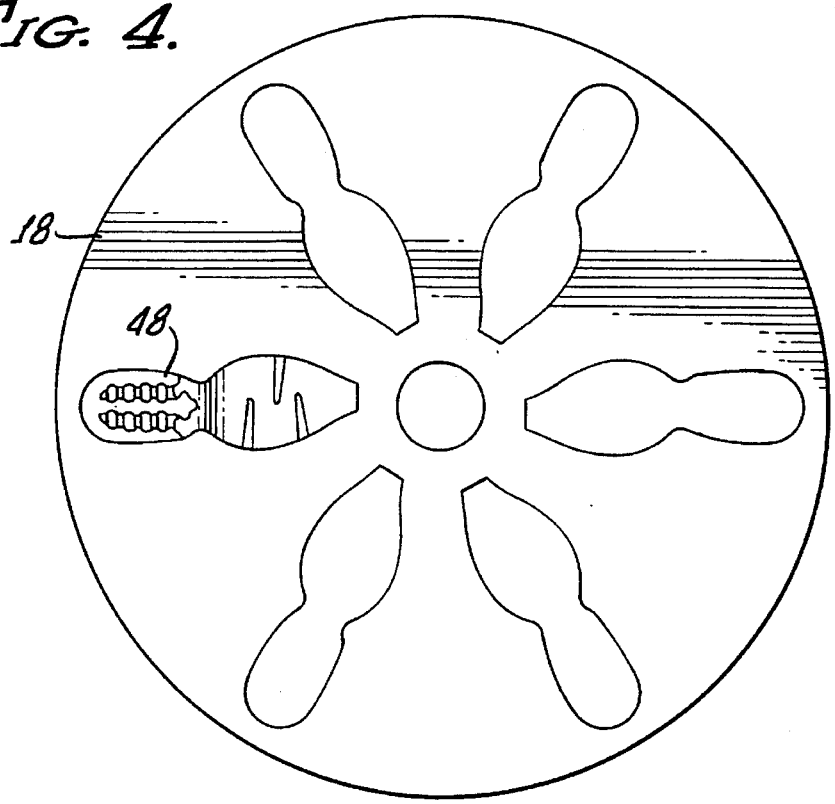

METHOD FOR ROTATIONALLY MOLDING AN ARTICLE WITH A VULNERABLE INSERT

BACKGROUND OF THE INVENTION

1. Field of the Invention

The present invention relates to a method for molding a solid article containing one or more vulnerable inserts, and more particularly to a centrifugal casting method utilizing curable fluid material. The insert, which may be dimensionally unstable or otherwise easily damaged by heat, pressure or solvents, is incorporated according to the present invention as an integral part of the finished article, firmly adhering to the cured fluid material molded around it without distortion or damage to the insert.

2. Description of the Related Art

A rapidly expanding class of manufactured items includes articles molded to incorporate inserts which are significantly more susceptible to damage by heat, pressure, velocity or solvents than are the host articles themselves. One representative group of such inserts would be those that are dimensionally unstable, including, for example, flexible sheet inserts such as pressure bladders, and brittle objects such as glass or plastics. Another group of vulnerable inserts would include those whose dimensions may be stable, but whose functions would be impaired by the environmental excesses of the molding process. This group might include delicate electronic components, pharmaceuticals, heat-degradable organic materials and shock-sensitive explosives. A third group could be made up of inserts including those from groups one and two which may be sensitive to solvents and adhesives commonly used to adhere the matrix material to the insert in the assembly process after the components have been made separately. Additionally, many of these adhesives and solvents have been shown to be harmful to the external natural environment, and many countries have banned articles prepared using them. Fabricating articles without damaging or distorting such inserts has traditionally presented a formidable challenge.

Molding processes involving the flow of liquid material commonly employ high heat and pressure to effect the curing of the liquid. These processes may be entirely satisfactory for molding physically rugged or temperature-insensitive articles. However, elevated heat and pressure methods are unsuitable for articles incorporating inserts that are highly susceptible to damage or distortion during the molding process. Alternate molding methods such as reaction injection molding may avoid extremes of heat and pressure, but depend upon the addition of reactants at high velocity to insure uniform dispersion and more even catalysis. Here again, such velocity could distort the shape or endanger the functionality of a vulnerable insert.

Still another method, low pressure casting by gravity introduction of the curing liquid into the mold, may decrease the detrimental effect of the foregoing environmental extremes, but tends to trap bubbles within the finished article. Such random cavities are detrimental to the structural integrity of the article, and slowing the reaction process enough to preclude the formation of these cavities would render the process economically infeasible.

While the trapping of bubbles can be minimized by introducing the curing liquid centrifugally into the mold, the potential for damage to the inserts remains significant. For example, heat and pressure are of concern in traditional centrifugal methods just as in the other molding methods discussed, and equipment structures in all methods are typically bulky or heavy in order to be strong enough to withstand the high heats and pressures required.

Accordingly, it is an object of this invention to rapidly produce molded articles containing one or more dimensionally unstable or easily damaged inserts without damaging or distorting those inserts.

It is another object of this invention to provide solvent-free production embedding of vulnerable inserts into solid, foam or combination solid and foam articles of various configurations.

SUMMARY OF THE INVENTION

In accordance with the process and apparatus of the present invention, one or more easily damaged or distorted inserts are secured safely within a cavity mold. Curable fluid is introduced into the mold to produce rapid and solvent-free incorporation of the vulnerable insert into a solid finished article, with no damage or distortion of the insert during the production process.

The present invention provides a centrifuge into whose central platen a curable fluid, for example, a reactive liquid polymer such as polyurethane is poured, flowing swiftly therefrom through a runner and gating system into peripherally mounted cavity molds. Each mold encloses at least one vulnerable insert, situated fixedly in place utilizing self-releasing securing devices that are nondamaging and nonheat-conducting. The wide variety of such inserts may include pressure bladders susceptible to dimensional distortion and heat damage, electronics components, and any other encapsulatable items of high fragility or instability.

According to one aspect of the present invention, any curable fluid introduced into the molds is carefully controlled to adequately fill the mold while avoiding any adverse impacts on the vulnerable insert. A reactive liquid polymer, for instance, is selected so that the speed of its reaction maintains its liquidity during the flow portion of the process. This reaction speed is controlled by the prudent combining of the individual catalyst chosen with a particular temperature for the mold and liquid.

The guiding process conditions are dictated by the damageability parameters of the particular insert in question. One needs to determine at which temperature and which pressure the insert will deform and adjust mold temperature and RPM of the centrifugal unit accordingly. For example, a particular insert may distort at a temperature of 70° C. at a pressure of 7.5 psi of force. The pressure exerted by centrifugal force may be calculated according to the following formula:

$$P = \tfrac{1}{2}\rho\omega^2 r^2$$

where:
P=Pressure in Pascals
$\rho$=Density in kg/m$^3$
$\omega$=Angular velocity in 1/sec
r=Distance to end of mold cavity in meters To convert the calculation into inches, PSI and RPM, the following would apply:

$$PSI = \frac{0.003536 \, (sp. \, gr) \, (RPM)^2 (in.)^2}{6896.9}$$

The insert within the mold cavity (at 70° C.) in a typical centrifugal unit, for example, is 15" from the center of the centrifugal unit. By applying the above formula, one can calculate that at approximately 235–240 RPM, a pressure of 7.5 PSI will be achieved using a 1.15 sp.gr. liquid polymer. Therefore, it would be advisable to operate the centrifugal machine at slightly less than this RPM to insure a safety margin. A 5% reduction in RPM can be used but a 10% reduction is preferred. Further reductions will widen the safety margin. As RPM drops, the filling time increases and necessitates slowing of the reaction rate so that the mold can be filled and the displaced air can escape prior to gelation of the polymer. However, due to the reduced polymer reactivity, an increased time in the mold for curing is needed before the part can be demolded. To counteract this disadvantage, the runner and particularly the gate can be increased in size. This allows for faster filling at low RPM but results in higher scrap rate when the large gate and runner material is trimmed off the part. As a general rule, balancing gate size (scrap) and reactivity (long demold time) it has been found that about 40% of the maximum usable RPM is the lower limit that permits good part production economy (i.e., rapid filling and low scrap), while still maintaining rapid demold times. Therefore, a range from 95 RPM (40%) to 215 RPM (90%) would be the most suitable for these types of moldings.

Depending upon the reactive liquid chosen, the finished article may be formed of solid material, foam or a combination of the two. When blowing agents are employed so that foams are produced in the mold, foam density is controlled to prevent damage to the vulnerable insert during the forming and curing process.

To produce a finished article composed of both solid and foamed material surrounding the vulnerable insert, more than one procedure may be employed. One alternative consists of the three operations of (1) casting and reacting the solid-forming liquid material against the insert or inserts, (2) removing the cured partially finished article with the insert incorporated therein and placing it into another mold, and (3) casting the foam-forming material into the second mold and curing to complete the finished article.

For those articles whose configurations allow, operation (2) of the above first alternative may be altered to eliminate the necessity for removing the partially finished articles to an entirely separate mold. Instead, the solid-formed partially complete article is cured in a mold having a common bottom and changeable tops, whereupon only the top of the first mold is removed from the common mold bottom and replaced with a second mold top which contains the cavity for the foamed portion of the article. Thereafter the foam-forming material is cast into the newly assembled mold configuration and cured as discussed above, thoroughly bonding together all three segments (solid, foam and insert) of the finished article.

These and many other features and attendant advantages of the present invention will become better understood by reference to the following detailed description of the preferred embodiments when taken in conjunction with the accompanying drawings.

BRIEF DESCRIPTION OF THE DRAWINGS

FIG. 3 is a plan view of a common mold bottom wheel;

FIG. 4 is a plan view of a first mold top wheel;

DETAILED DESCRIPTION OF THE PREFERRED EMBODIMENTS

Figure 1:
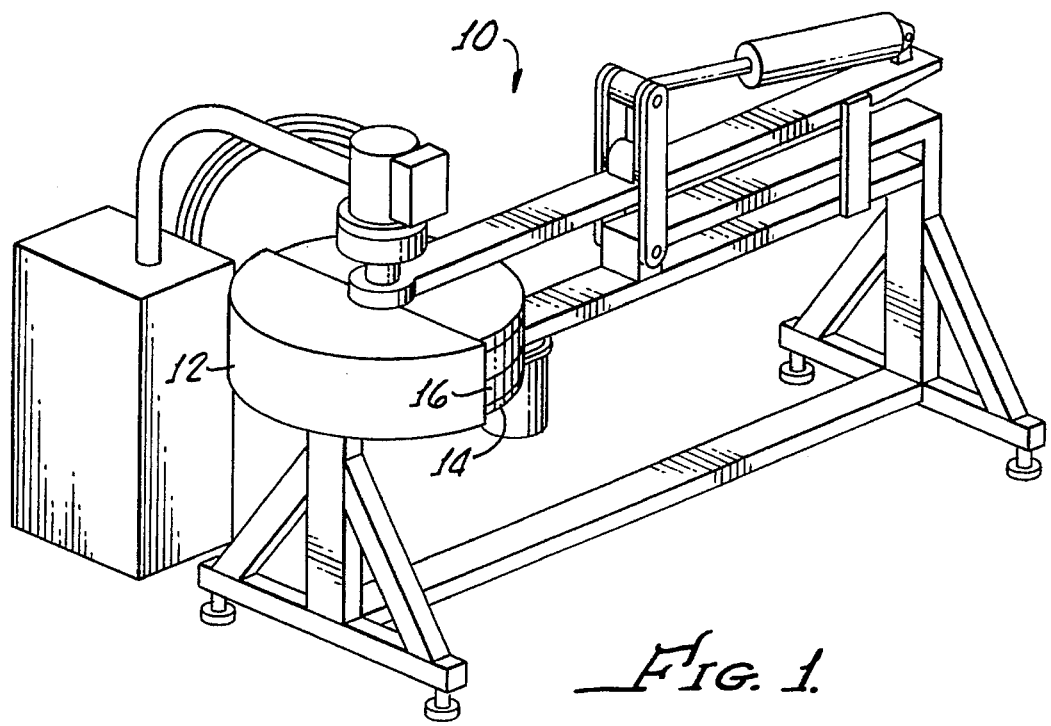
FIG. 1 is an isometric view of an article molding apparatus embodying the present invention.

Apparatus 10 for molding a solid article with vulnerable inserts according to the present invention is illustrated in FIG. 1. While the following description is directed to the molding of a shoe containing an air bladder as a vulnerable insert, it will be understood that the method of the present invention encompasses the encapsulating of other fragile or unstable inserts such as, for example, electronic components into a variety of solid articles.

Figure 5:
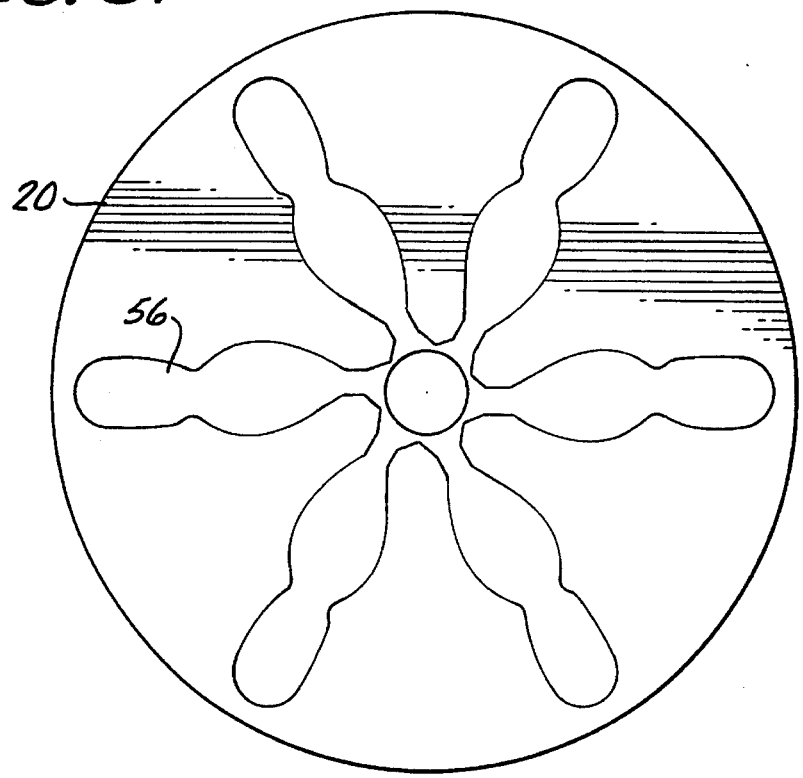
FIG. 5 is a plan view of a second mold top wheel.
Figure 6:
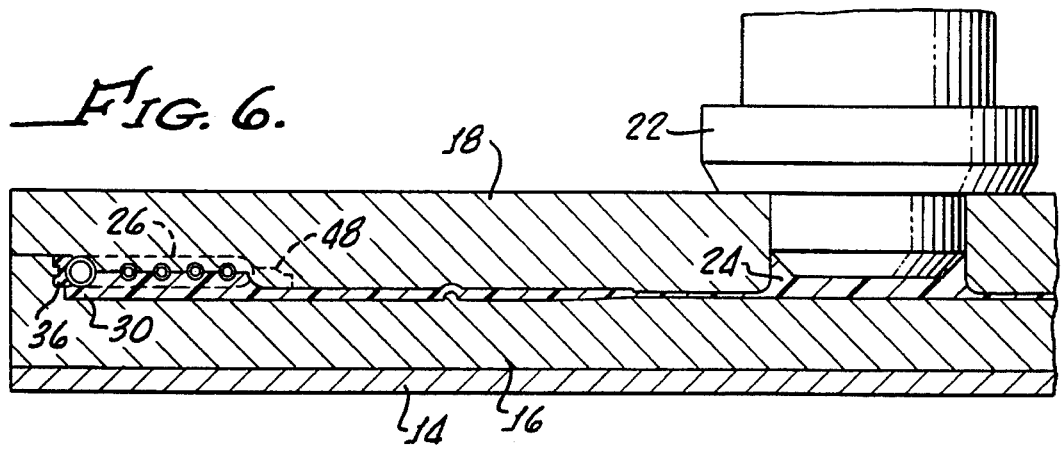
FIG. 6 is a section elevation view illustrating the flow of curable fluid into cavities formed by a common mold bottom and first mold top of the present invention.
Figure 7:
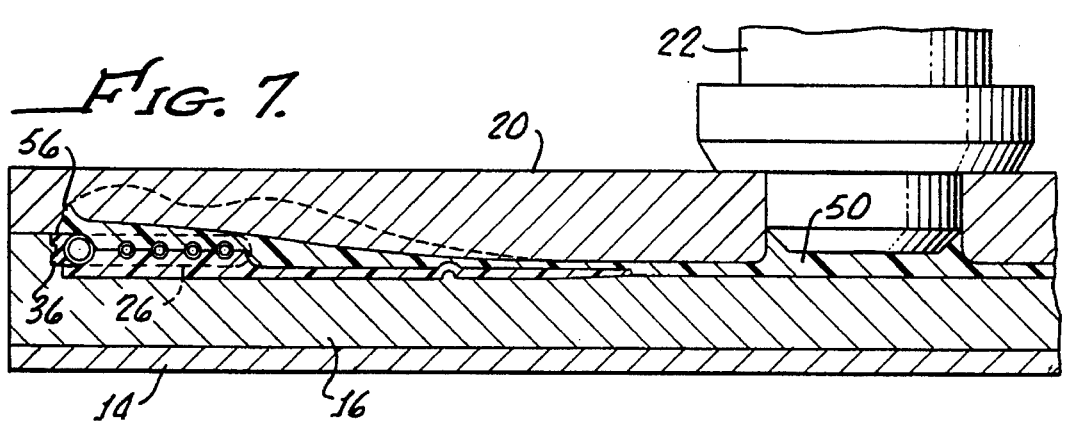
FIG. 7 is a section elevation view illustrating the operation of FIG. 6 with a second mold top in place of the first mold top.

In one preferred embodiment of the present invention, mold housing 12 covers a spinnable platen 14 supporting mold bottom wheel 16 and, successively, first mold top wheel 18 and second mold top wheel 20, as illustrated in FIGS. 3, 4 and 5. Housing 12 also accommodates fluid entry port 22 for admitting curable fluids 24 and 50 into the center of mold wheels 16, 18, 20, as illustrated in FIGS. 6 and 7. This embodiment produces a solid article utilizing both solid-forming and foam-forming fluids, sequentially.

Figure 2:
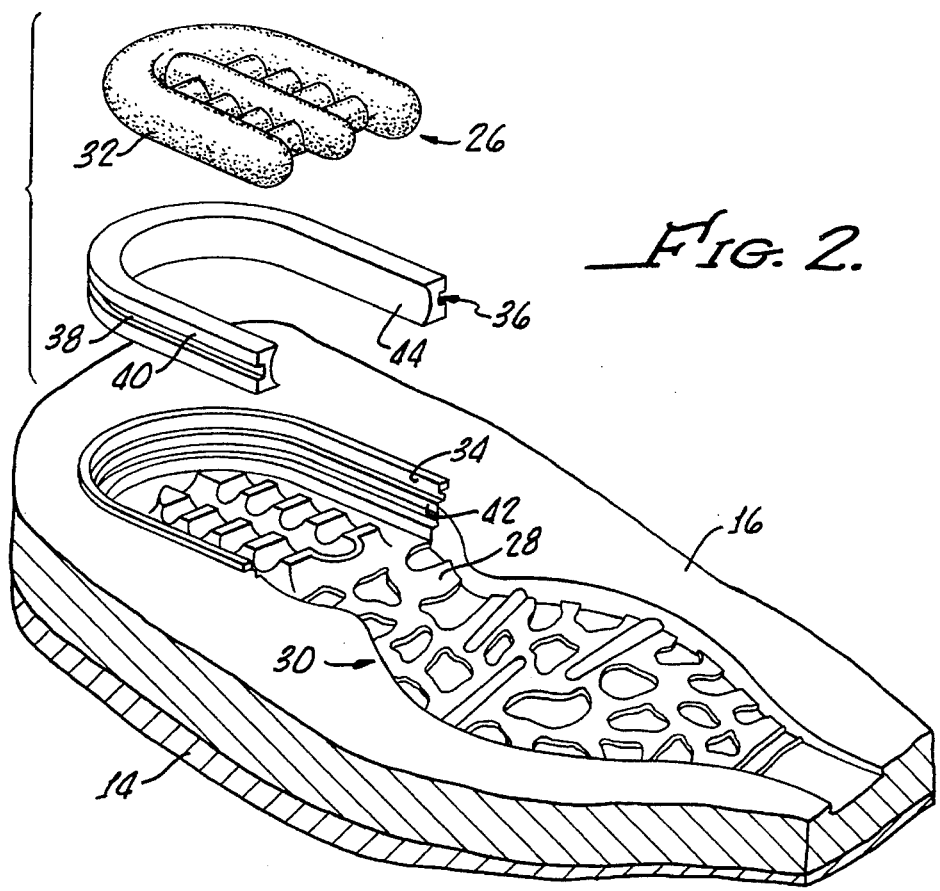
FIG. 2 is a partial isometric view of a mold bottom with related elements exploded to show details of assembly.

As curable fluids 24 and 50 fill the cavities formed by mating of mold bottom wheel 16 with its respective mold top wheels, any vulnerable insert within a mold must be protected from damage or distortion. Such impairment of the insert may result, for example, from the heat or force of the fluid. Typical of vulnerable inserts is the polyurethane air bladder shown as insert 26 in FIG. 2. Insert 26 must be suspended above the floor 28 of individual mold bottom 30 so that curable fluid 24 may flow beneath insert 26, establishing support for insert 26 as part of the final cured article.

The present invention employs a self-releasing securing device 36 to suspend insert 26 securely above the floor of individual mold bottom 30, insulating insert 26 from the heat of mold interior side wall 34.

Self-releasing securing device 36, as shown in this embodiment, is a flexible structure formed, for example, of polytetrafluoroethylene (PTFE) elastomer, room temperature vulcanizing silicone (RTV) or two-component silicone rubber to grip insert 26. These materials are selected because of their relatively firm grip on the substance of vulnerable insert 26, their heat insulation properties, and their separability from fluid 24 through completion of the curing process (self-releasing property). Securing device 36 has a U-shaped configuration, with a groove 38 formed in its convex outer edge 40 that is dimensioned to mate with tongue 42 projecting from the concave inner side wall 34 of individual mold bottom 30. When securing device 36 is installed in place, its concave inner edge 44 maintains firm contact with the outer side wall 32 of insert 26, holding, insulating and supporting insert 26 during the molding process. It will be readily understood that the gripping inner edge 44 of self-releasing securing device 36 may be configured to conform to the outer shape of whatever vulnerable insert is incorporated, and outer edge 40 may be configured to conform to the surrounding interior shape of the mold employed in fabricating the finished article.

When vulnerable insert 26 is situated firmly in place within mold bottom side wall 34, mold bottom wheel 16 supported by platen 14 is coupled to first mold top wheel 18 so that each individual mold bottom 30 forms a mold cavity with its corresponding individual first mold top 48, as illustrated in FIG. 6. Platen 14 is then activated to spin mold wheels 16, 18 while a curable fluid 24, for example, a reactive solid-forming polymer such as polyurethane, is introduced into fluid entry port 22 through a runner and gating system into the center of mold wheels 16, 18. Curable fluid 24 and molds 30, 48 are maintained at a temperature that is determined by the nature of the individual catalyst utilized, in order to maintain the liquidity of fluid 24 during the flow portion of the process. A temperature on the order of 70° C., advantageously lower than that of prior molding methods, is typical for the method of the present invention. Similarly, rotational speeds of platen 14 need not exceed 95 to 215 revolutions per minute for even distribution of fluid 24, beneficially lower than those required for other centrifugal molding methods.

Figure 8:
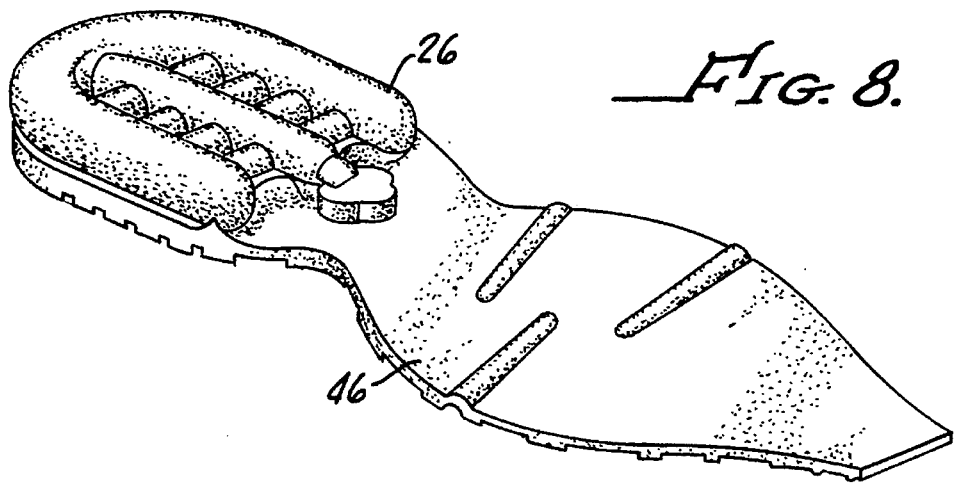
FIG. 8 is an isometric view of a cured article first component after molding utilizing the first mold top.

After solid-forming fluid 24 has filled the cavity formed by molds 30, 48, the fluid is cured, incorporating and bonding vulnerable insert 26 into first molded component 46 of the solid article as illustrated in FIG. 8. The first mold top wheel 18 is then removed, leaving each first molded component 46 secured within each individual common mold bottom 30 in preparation for receiving a foam-forming fluid to complete the molding of the solid article.

Figure 9:
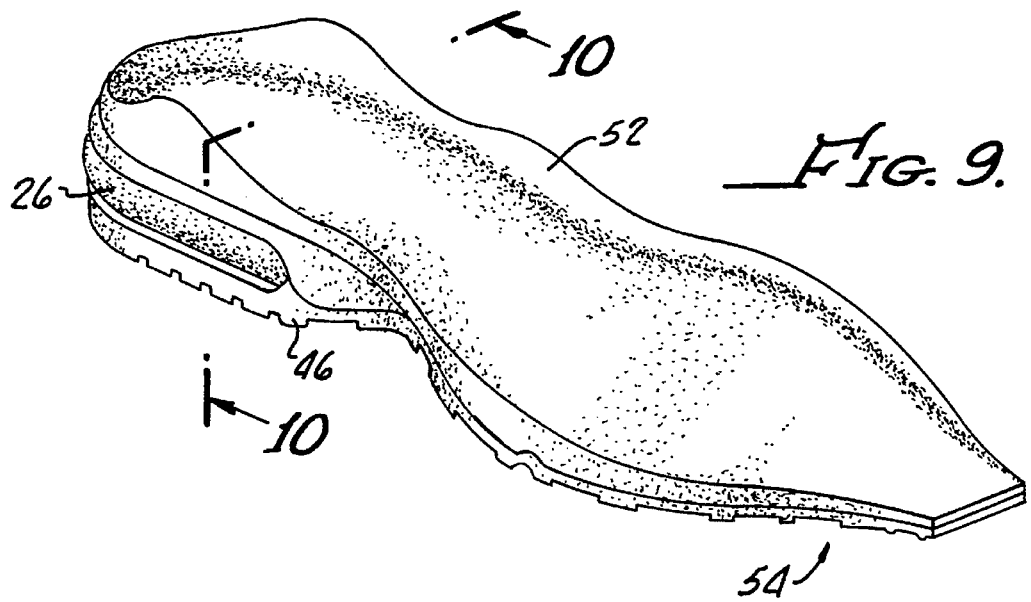
FIG. 9 is an isometric view of a completed cured article after molding utilizing the second mold top.
Figure 10:
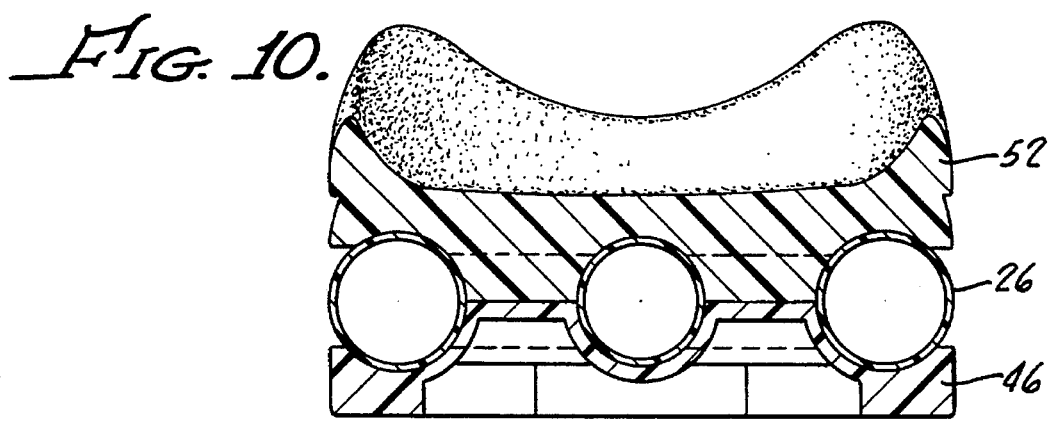
FIG. 10 is a section view taken along lines 10—10 of FIG. 9.

Second mold top wheel 20 is then coupled to mold bottom wheel 16 so that individual second mold top 56 cavity is formed above first molded component 46, as illustrated in FIG. 7. Platen 14 then spins mold wheels 16, 20 while foam-forming fluid 50 is introduced into fluid entry port 22 to form second molded component 52 (FIG. 9) under conditions of flow, temperature and rotation similar to those previously described for solid-forming fluid 24. Vulnerable insert 26 continues to be held firmly by securing device 36 to prevent distortion or dysfunction while second molded component 52 is curing. Second molded component 52 thus bonds with first molded component 46. The bonded components 46, 52 are then removed from securing device 36, and solid article 54, incorporating undamaged insert 26, is complete.

A second embodiment of the present invention utilizes a plurality of separate individual complete molds for forming the first molded component 46 incorporating protected insert 26. Each first component 46 is then physically removed to a different mold wherein foam-forming liquid 50 is introduced and cured to form completed solid article 54.

A third embodiment utilizes a plurality of single molds, each securing vulnerable inserts 26 therewithin to produce the entire solid or foam article at the completion of one cycle including introducing one curable fluid, spinning the molds and curing the fluid.

Although the foregoing Detailed Description illustrates methods for molding an article with a vulnerable insert in accordance with the present invention, for the purpose of describing a manner in which the invention may be used to advantage, it should be appreciated that the invention is not limited thereto. Accordingly, any and all modifications, variations, or equivalent arrangements which may occur to those skilled in the art should be considered to be within the scope of the present invention as defined in the appended claims.

What is claimed is:

1. A method for molding a solid article from both solid-forming and foam-forming reactive liquid polymer materials, said article having a first molded component and a second molded component and said article incorporating at least one vulnerable insert, said method comprising the steps of:

providing a controllably spinnable platen having temperature controllable first and second cavity molds mounted alternately thereon and means for distributing said liquid polymer material into said molds;

securing said insert stably and insulatedly within said first mold;

introducing said solid-forming polymer material into said means for distributing said polymer material;

spinning said platen at a controlled rotational speed and controlled temperature to move said solid-forming polymer material into said first mold without distorting said insert;

curing said solid-forming polymer material to form said first molded component and to incorporate and bond said insert into said first molded component;

removing a replaceable first mold top of said first mold from a common mold bottom and replacing said first mold top with a second mold top coupled with said common mold bottom to form said second mold, thus maintaining said first molded component secured within said common mold bottom;

introducing said foam-forming polymer material into said means for distributing said polymer material;

spinning said platen at a controlled speed and temperature to move said foam-forming polymer material into said second mold without distorting said insert;

curing said foam-forming polymer material to form said second molded component and to bond said first molded component with said second molded component to form said solid article; and removing said article with said insert incorporated therein from said second mold.

2. A method for molding a solid article from both solid-forming and foam-forming reactive liquid polymer materials, said article having a first molded component and a second molded component and said article incorporating at least one vulnerable insert, said method comprising the steps of:

providing a controllably spinnable platen having temperature controllable first and second cavity molds mounted alternately thereon and means for distributing said liquid polymer material into said molds;

securing said insert stably and insulatedly within said first mold;

introducing said solid-forming polymer material into said means for distributing said polymer material;

spinning said platen at a controlled rotational speed and controlled temperature to move said solid-forming polymer material into said first mold without distorting said insert;

curing said solid-forming polymer material to form said first molded component and to incorporate and bond said insert into said first molded component;

situating said first molded component within said second mold;

introducing said foam-forming polymer material into said means for distributing said polymer material;

spinning said platen at a controlled speed and temperature to move said foam-forming polymer material into said second mold without distorting said insert;

curing said foam-forming polymer material to form said second molded component and to bond said first molded component with said second molded component to form said solid article; and removing said article with said insert incorporated therein from said second mold.

3. The method of claim 2 wherein the step of spinning said platen is performed at a speed of 95 to 215 revolutions per minute.

* * * * *